United States Patent
Nanjundaswamy

(10) Patent No.: US 9,811,386 B2
(45) Date of Patent: Nov. 7, 2017

(54) SYSTEM AND METHOD FOR MULTITENANT EXECUTION OF OS PROGRAMS INVOKED FROM A MULTITENANT MIDDLEWARE APPLICATION

(71) Applicant: Oracle International Corporation, Redwood Shores, CA (US)

(72) Inventor: Vijay Kyathanahalli Nanjundaswamy, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 69 days.

(21) Appl. No.: 15/059,193

(22) Filed: Mar. 2, 2016

(65) Prior Publication Data

US 2017/0116041 A1    Apr. 27, 2017

Related U.S. Application Data

(60) Provisional application No. 62/245,611, filed on Oct. 23, 2015.

(51) Int. Cl.
*G06F 9/46* (2006.01)
*G06F 9/50* (2006.01)
(Continued)

(52) U.S. Cl.
CPC ........... *G06F 9/5077* (2013.01); *G06F 9/455* (2013.01); *G06F 17/30233* (2013.01)

(58) Field of Classification Search
None
See application file for complete search history.

(56) References Cited

U.S. PATENT DOCUMENTS

2009/0276771 A1    11/2009   Nickolov
2012/0179646 A1*   7/2012    Hinton ............. G06F 17/30557
                                                    707/607
(Continued)

OTHER PUBLICATIONS

European Patent Office, International Searching Authority, International Search Report and Written Opinion dated Nov. 29, 2016 for International Patent Application No. PCT/US2016/051099, 12 Pages.

(Continued)

*Primary Examiner* — Sisley Kim
(74) *Attorney, Agent, or Firm* — Tucker Ellis LLP

(57) ABSTRACT

In accordance with an embodiment, described herein is a system and method for supporting multitenant execution of a tenant-unaware program invoked from a multitenant middleware application. An exemplary method can provide a plurality of partitions, and a plurality of tenant-aware programs, wherein each of the plurality of tenant-aware programs is associated with a partition. The method can associate each of the plurality of partitions and the plurality of tenant-aware programs with a tenant of a plurality of tenants. The method can invoke the tenant-unaware process from a calling partition of the plurality of partitions, the calling partition being associated with a calling tenant of the plurality of tenants. The method can collect tenancy information about the calling tenant. And, based upon the collected tenancy information, the method can scope execution of the tenant-unaware process to the calling tenant by setting up a process execution environment and resources.

21 Claims, 12 Drawing Sheets

(51) Int. Cl.
*G06F 17/30* (2006.01)
*G06F 9/455* (2006.01)

(56) References Cited

U.S. PATENT DOCUMENTS

| | | |
|---|---|---|
| 2013/0332577 A1 | 12/2013 | Nakil |
| 2014/0047439 A1 | 2/2014 | Levy |
| 2015/0207758 A1* | 7/2015 | Mordani ................. H04L 47/78 709/226 |

OTHER PUBLICATIONS

Kang, Junbin et al., "MultiLanes: Providing Virtualized Storage for OS-level Virtualization on Many Cores", 12th USENIX Conference on File and Storage Technologies (FAST '14), Feb. 17-20, 2014, Santa Clara, CA, ISBN 978-1-931971-08-9, 14 pages.

U.S. Office Action dated Apr. 27, 2017 for U.S. Appl. No. 14/748,094 , 12 Pages.

* cited by examiner

SYSTEM AND METHOD FOR MULTITENANT EXECUTION OF OS PROGRAMS INVOKED FROM A MULTITENANT MIDDLEWARE APPLICATION

CLAIM OF PRIORITY

This application claims the benefit of priority to U.S. Provisional Application titled "SYSTEM AND METHOD FOR TENANT SCOPED EXECUTION OF OS PROGRAMS INVOKED FROM A MULTITENANT MIDDLEWARE APPLICATION", Application No. 62/245,611, filed Oct. 23, 2015, which application is herein incorporated by reference; and is related to U.S. Patent Application titled "SYSTEM AND METHOD FOR SUPPORTING MULTI-TENANCY IN AN APPLICATION SERVER, CLOUD, OR OTHER ENVIRONMENT", application Ser. No. 14/601,883, filed Jan. 21, 2015; and U.S. Patent Application titled "SYSTEM AND METHOD FOR SUPPORTING PARTITIONS IN A MULTITENANT APPLICATION SERVER ENVIRONMENT", application Ser. No. 14/748,094, filed Jun. 23, 2015, which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for supporting applications invoked from a multitenant middleware platform.

BACKGROUND

Software application servers, examples of which include Oracle WebLogic Server (WLS) and Glassfish, generally provide a managed environment for running enterprise software applications. Recently, technologies have also been developed for use in cloud environments, which allow users or tenants to develop and run their applications within the cloud environment, and to take advantage of distributed resources provided by the environment.

SUMMARY

In accordance with an embodiment, described herein is a system and method for supporting multitenant execution of a tenant-unaware program invoked from a multitenant middleware application. An exemplary method can provide a plurality of partitions, and a plurality of tenant-aware programs, wherein each of the plurality of tenant-aware programs is associated with a partition. The method can associate each of the plurality of partitions and the plurality of tenant-aware programs with a tenant of a plurality of tenants. The method can invoke the tenant-unaware process from a calling partition of the plurality of partitions, the calling partition being associated with a calling tenant of the plurality of tenants. The method can collect tenancy information about the calling tenant. And, based upon the collected tenancy information, the method can scope execution of the tenant-unaware process to the calling tenant by setting up a process execution environment and resources.

In accordance with an embodiment, using containerized applications, the scoped execution can support runtime isolation of a tenant-unaware process from other tenants of the multitenant middleware environment, resulting in multitenant operation of the OS application program.

DETAILED DESCRIPTION

In accordance with an embodiment, described herein is a system and method for supporting tenant scoped execution (also referred to herein variously as "multitenant execution") of a tenant-unaware process invoked from a multitenant middleware application. An exemplary method can provide a plurality of partitions, and a plurality of tenant-aware programs, wherein each of the plurality of tenant-aware programs is associated with a partition. The method can associate each of the plurality of partitions and the plurality of tenant-aware programs with a tenant of a plurality of tenants. The method can invoke the tenant-unaware process from a calling partition of the plurality of partitions, the calling partition being associated with a calling tenant of the plurality of tenants. The method can collect tenancy information about the calling tenant. And, based upon the collected tenancy information, the method can scope execution of the tenant-unaware process to the calling tenant by setting up a process execution environment and resources.

By using the described systems and methods herein, in accordance with an embodiment, tenant aware JEE applications (e.g., SaaS applications), which include non-Java components running as native programs/processes on operating systems can work in tenant scoped manner, making the complete application (end-to-end) multi-tenant aware and isolated. That is, the multi-tenancy support provided within a multi-tenant application server environment can be supported outside of the MT application server environment on a native OS, and not be restricted to components/programs running within the MT application server environment (e.g., WebLogic MT).

Application Server (e.g., Multi-Tenant, MT) Environment

Figure 1:
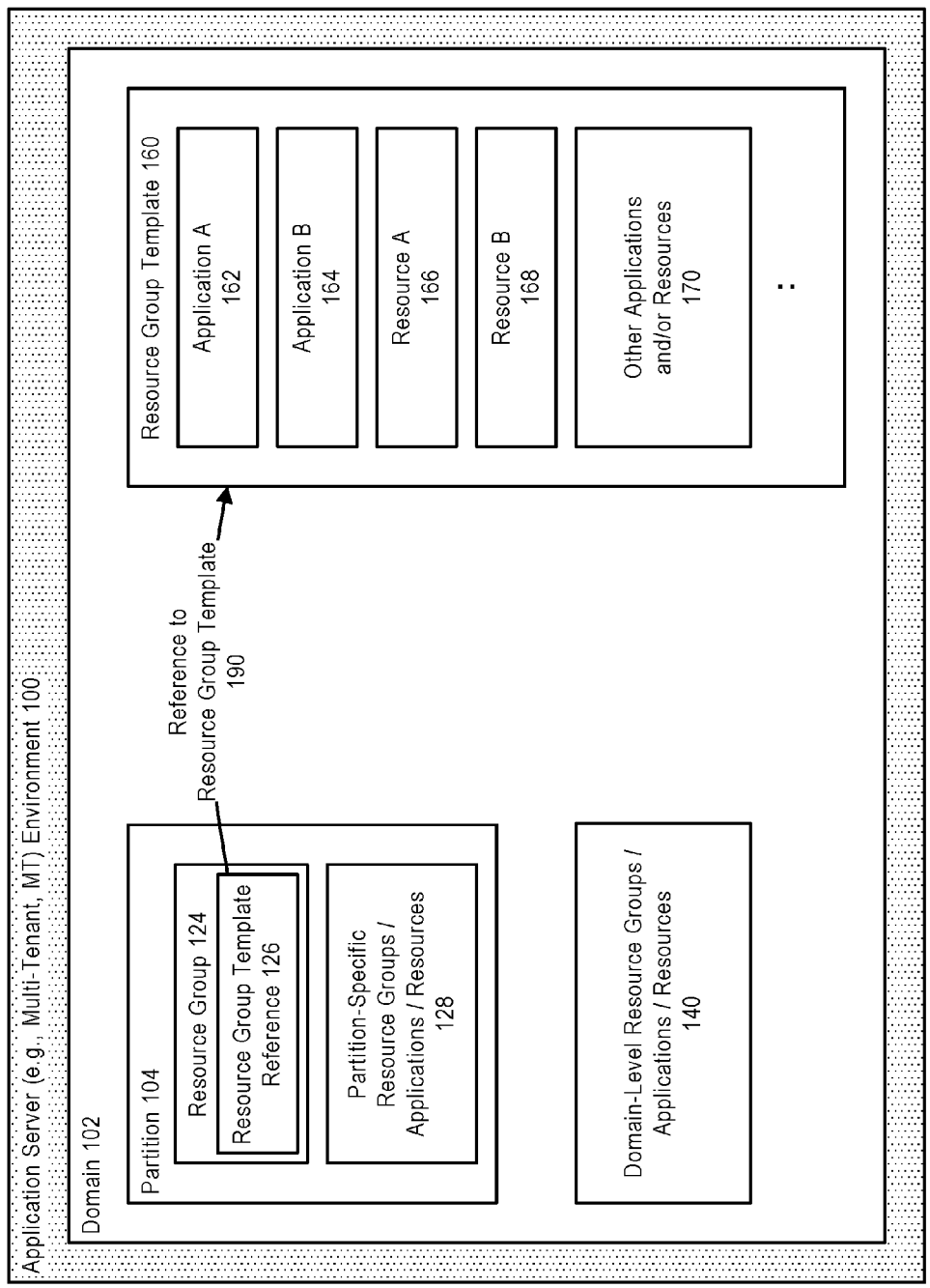
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
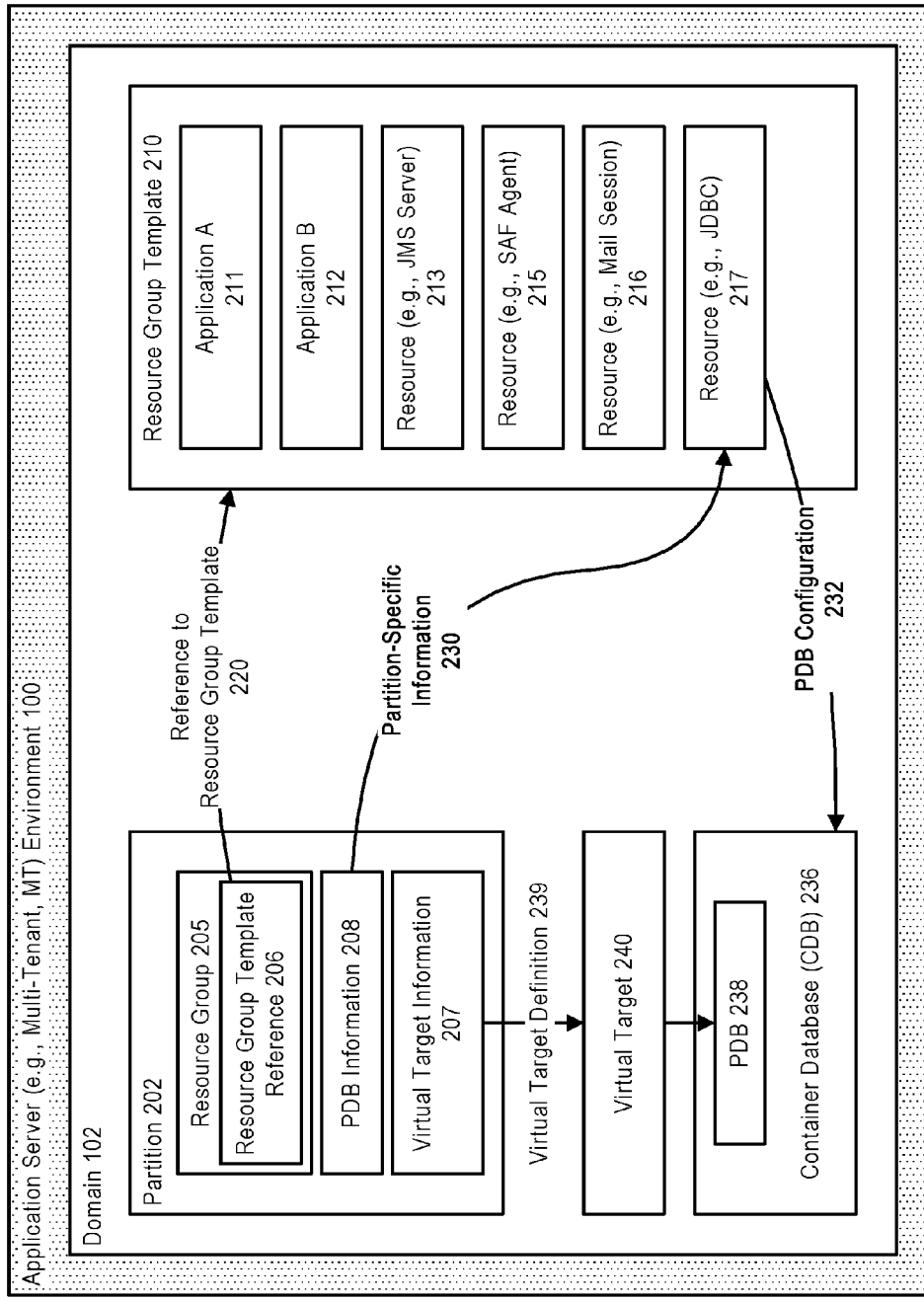
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
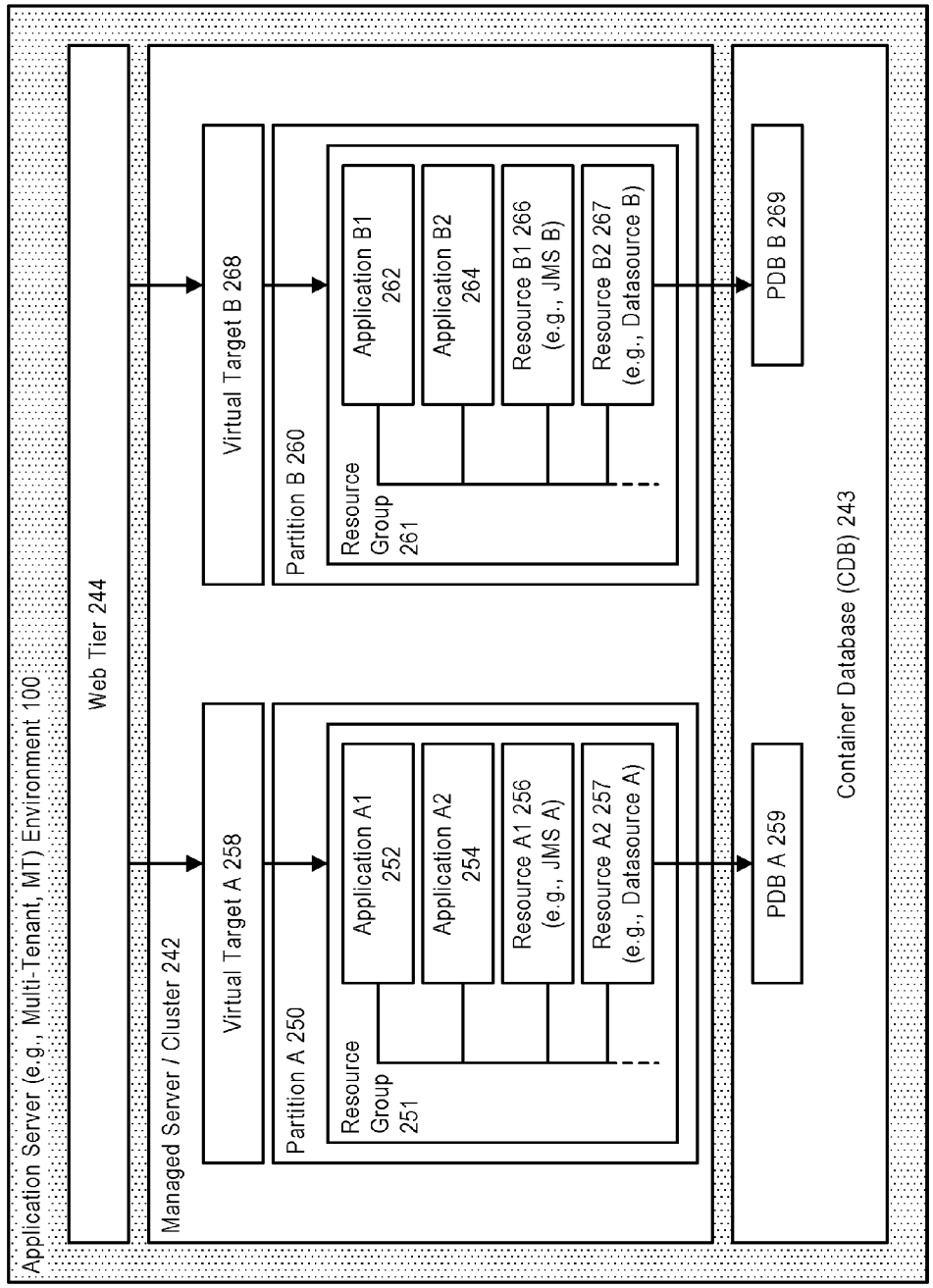
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition.

Figure 4:
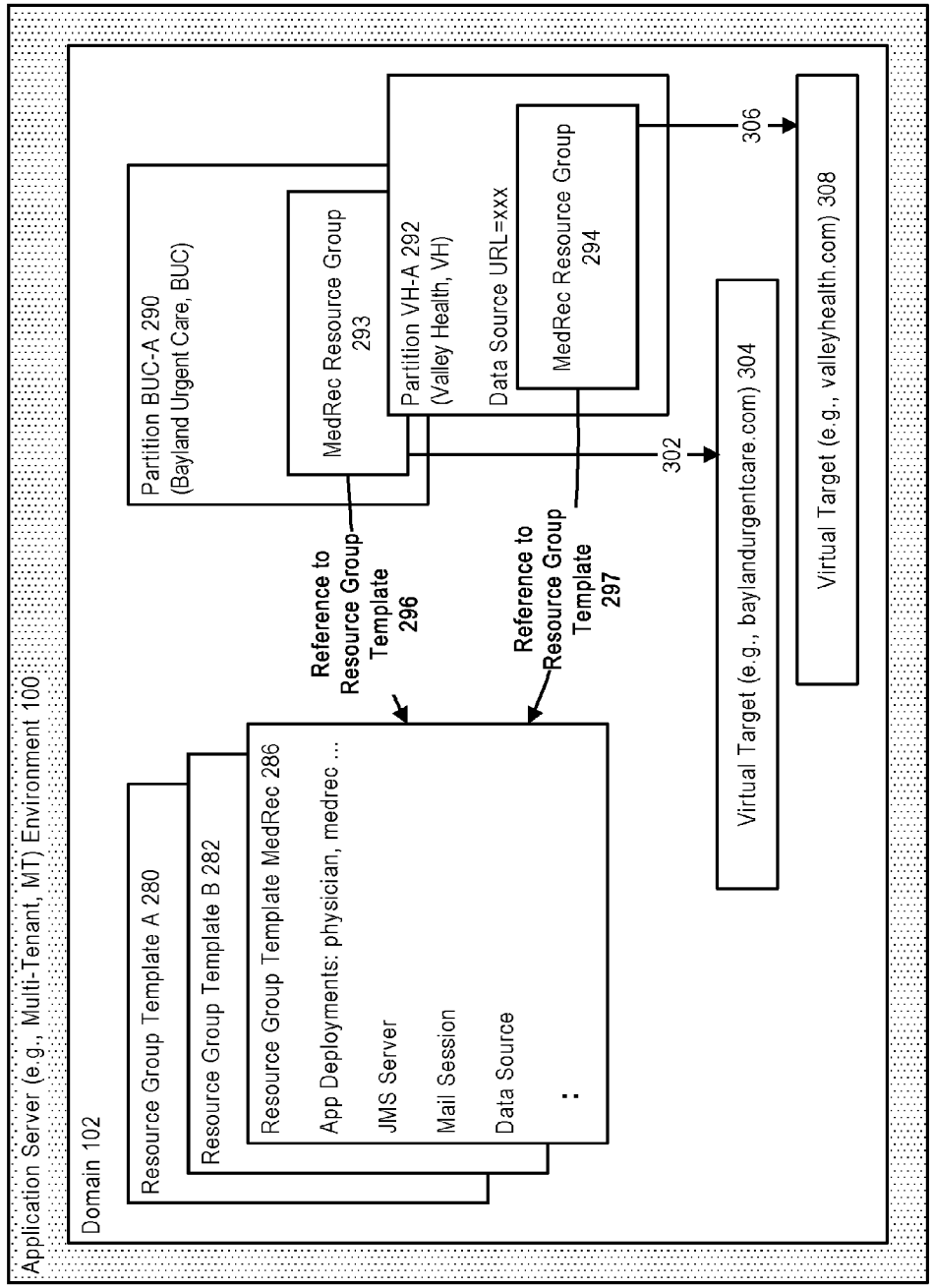
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition: <partitionName>/<resource JNDI name>, or domain: <resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
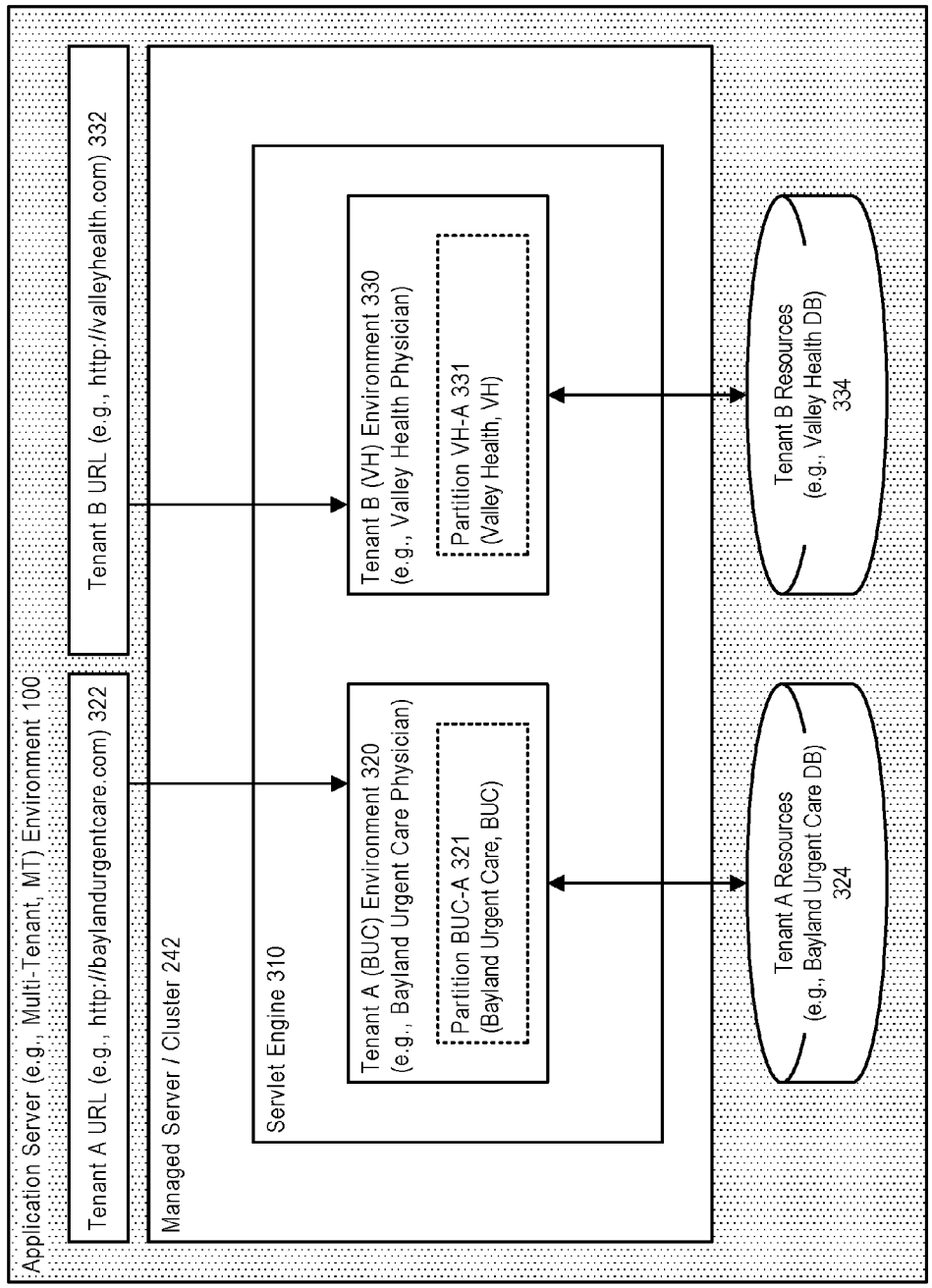
FIG. 5 further illustrates an exemplary multi-tenant environment, in accordance an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a Bayland Urgent Care database, or a Valley Health database respectively. The database instances can use compatible schemas, since the same application code will execute against both databases. When the system starts the partitions, it can create the virtual targets and connection pools to the respective database instances.

Tenant Scoped Execution of OS Programs

In accordance with an embodiment, the methods and systems described herein can support tenant scoped execution of OS (i.e., tenant unaware) programs, applications, and processes (variously referred to herein after as "OS programs", "OS applications", "OS processes", "non-tenant aware programs", "non-tenant aware applications", and "non-tenant aware processes").

Typically, when applications are executed within a MT environment, the applications are tenant scoped, meaning that the libraries and resources accessed by the tenant aware programs are isolated from, for example, other tenants within the MT environment.

However, when a tenant aware program operating in an MT environment calls a tenant unaware application (e.g., C, C++, Perl . . . etc.) operating on a native OS, an issue can arise in that there is little or no isolation between these programs operating on the OS. That is, a general purpose operating system has no notion of tenancy and is unaware of tenancy (i.e., tenancy information associated with the originating call from the MT application) associated with the MT application (i.e., JEE application). This can lead to execution of OS programs within a common environment and using shared OS resources (e.g., files, processes, databases), which in turn can lead to loss of tenant context as well as runtime separation/isolation, when separate tenant applications call an outside OS application (e.g., tenant unaware application).

Figure 6:
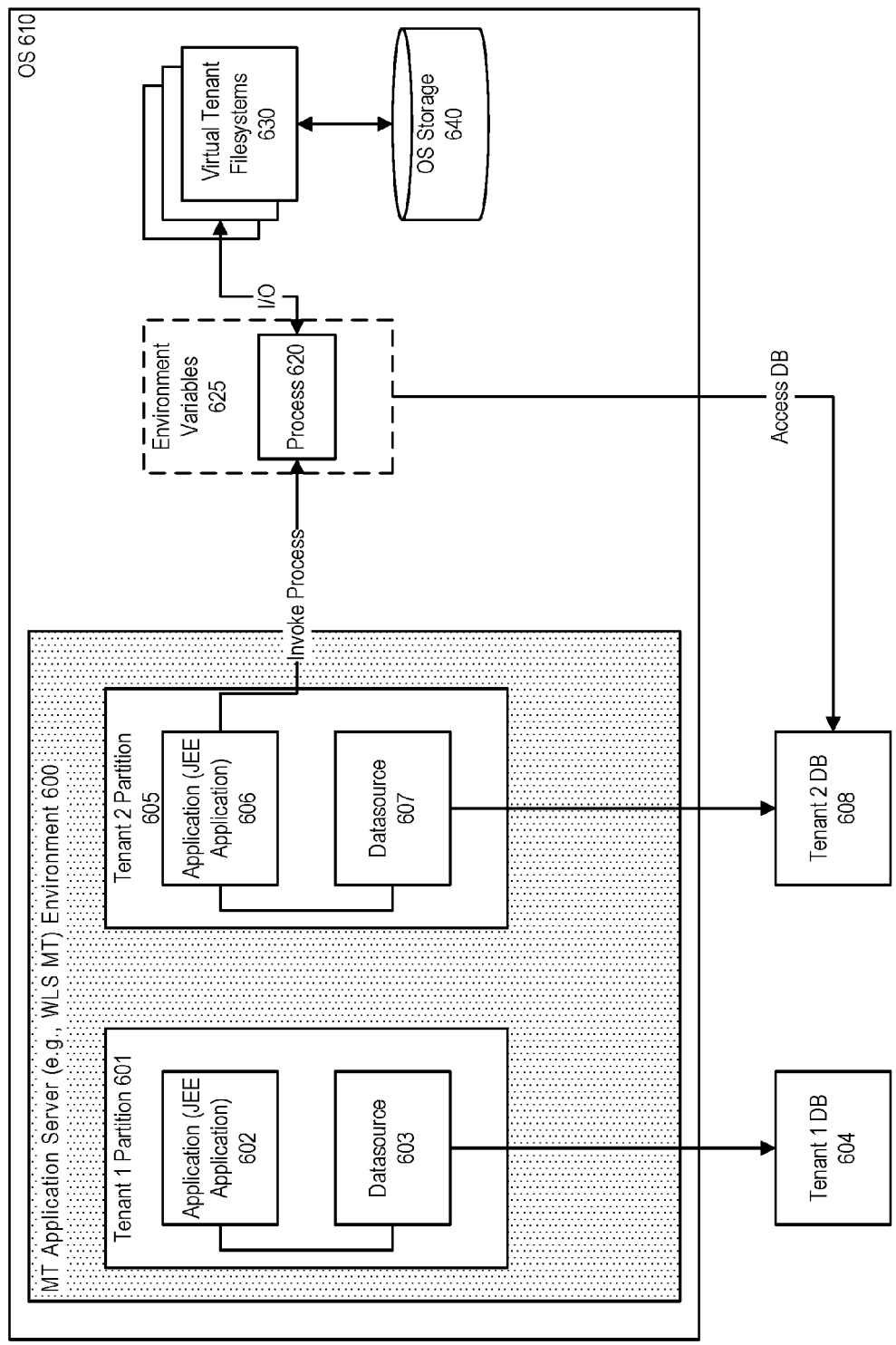
FIG. 6 illustrates a system for tenant scoped execution of a tenant-unaware process, in accordance with an embodiment.

FIG. 6 illustrates a system for tenant scoped execution of a tenant-unaware process, in accordance with an embodiment. As shown in FIG. 6, a Multitenant Application Server Environment 600 (e.g., WebLogic Multitenant) can comprises a number of tenant partitions, such as tenant 1 partition 601 and tenant 2 partition 605. Both tenant 1 partition and tenant 2 partition can be associated with an application, such as a JEE application 602, 606, respectively, which are associated with a datasource 603, 607, respectively, which allows access to each tenant's respective database 604, 608, respectively.

In accordance with an embodiment, an application, such as a JEE application associated with tenant 2, can invoke an OS program (invoke process) that is located outside of a Multitenant Application Server in, for example, a native OS 610. This can occur, for example, when there are components of MT applications that are not confined to the MT application server (e.g., Perl script, C programs . . . etc.). Such applications (i.e., those MT applications that also rely external OS components that run outside of the MT application server to perform) can be referred to as composite applications. The JEE application associated with tenant 2 runs in a MT environment and has tenant context associated at runtime.

In accordance with an embodiment, when a MT application (e.g., a JEE application), invokes an OS program/application (i.e., process 620), the MT application can set up a number of variables 625 (i.e., environment variables) in order to extend/propagate the tenant context that is available to the JEE application. These variables can include a tenant ID, a tenant name; a tenant filesystem (TFS) root; a process work directory, under TFS, with input and output subdirectories; a tenant DB connect string, and a tenant LDAP (lightweight directory access protocol) directory URL.

In accordance with an embodiment, the MT application server can manage a virtual tenant filesystem 630 for each tenant that has been on-boarded into the MT application server environment 600. This virtual tenant file system can be created/set up as part of an application server administration when a tenant is on-boarded. The virtual tenant filesystems are part the OS 610, with one virtual tenant filesystem for each tenant currently active in the MT application server environment.

In accordance with an embodiment, when an MT application (e.g., JEE application) invokes an OS process (i.e., tenant unaware process), the MT application can additionally create a temporary process work directory under the tenant's virtual filesystem. If more than one OS process is invoked by an MT application, the MT application can create one temporary work directory for each OS process invoked. The MT application, in creating the temporary work directory under the virtual filesystem, can additionally create (for each OS process invoked) subdirectories under the temporary work directory for input, output, error and database directories. These subdirectories can accept redirected stdin (input stream), stdout (output stream) and stderr (error stream) of the invoked OS process. Each input subdirectory can be set up with process input files. Each output subdirectory can be responsible for capturing process output files. Each error subdirectory can be responsible for capturing process error (e.g., stderr) messages. The virtual tenant specific filesystems can be associated with a native storage, such as OS storage 640.

In accordance with an embodiment, a process builder can comprise an API (e.g., Java ProcessBuilder API) that allows a client to specify a command line for an OS program/application to execute, configure environment variables to set up in the process environment, configure a process work directory, and redirect the process input, output, and error streams to files on a file system. The process builder can allow certain process characteristics to be set up or configured before a process (i.e., OS process) is started, such as a process environment, a process working directory, and process input stream/output stream/error stream re-direction.

In accordance with an embodiment, when a MT application invokes an OS process, it can create and utilize a process builder (e.g., process builder instance). The tenancy context from the MT application can be propagated as part of the process builder API invocation, including setting environmental variables and creating and configuring the process work directory. By utilizing the environment variables along with the process work directory, the process builder can be configured in order to assign resources (environment variables, process work directory, redirected input/out files, a database connect descriptor, LDAP directory, wallet) that allows the tenant unaware process (e.g. OS process) to be scoped/confined in its execution within the tenancy context. In this way, the tenant unaware process (e.g., OS process) gets a work directory that is specific to the invoking tenant and under the tenant designated virtual filesystem and isolated from the files and resources created or owned by other tenants of the MT application server environment 600.

In accordance with an embodiment, the tenant unaware process is assigned a tenant specific folder under the OS file-system for redirected process I/O streams, connects to the database associated with the tenant using tenant specific access credentials, and uses tenant LDAP directory. A tenant specific database connect string/descriptor can allow programs to transparently work with the tenant database. Tenant specific credentials can be configured in a wallet set up under a database subdirectory of the process work directory in the tenant's virtual filesystem.

In accordance with an embodiment, after a virtual tenant filesystem has been created for the calling MT application from a calling partition (associated with a tenant, sometimes referred to as a "calling tenant"), the streams (e.g., input stream, output stream, error stream) associated with the tenant unaware process can be redirected to the respective input, output and error subdirectories under the process work directory in the tenant's virtual filesystem In this way, the tenancy context, environment and data associated with separate tenants invoking OS programs can be kept discrete and separated from each other, thus allowing for scoped processing of an OS application (tenant unaware)

executing based upon a call from inside of a MT container (e.g., from a JEE program executing on behalf of a partition within the MT container).

In accordance with an embodiment, once the tenant unaware process completes execution, the MT application running in the MT application server environment can retrieve the process output and clean up the process work directory.

In accordance with an embodiment, the MT application can get the process exitValue status code (e.g., from java Process object exitValue( ) method) to find if the program executed successfully. It can also retrieve the redirected stdout and stderr files under the output and error sub-folders, to examine if the process execution was successful. The results updated in the tenant database can be directly accessed from the database by the MT application running in the partition, once the tenant unaware process execution completes.

In accordance with an embodiment, the MT application can also delete the process work directory and its sub-folders, which cleans up the output files and the db files, such as the wallet.

In accordance with an embodiment, the environment variables configured at the MT application that calls the OS program can comprise: a tenant ID, a tenant name; a tenant filesystem (TFS) root; a process work directory, under TFS, with input, output, and error sub-directories; a tenant DB connect string, and a tenant LDAP (lightweight directory access protocol) directory URL.

In accordance with an embodiment, using a process builder configuration, a tenant-unaware OS program can be assigned resources (environment variables, process work directory, redirected input/output files, a DB connect descriptor, LDAP directory, and wallet) that scope/confine its execution within a tenant context.

Multitenant Execution of OS Programs—Containerized Applications

In accordance with an embodiment, the methods and systems described herein can support multitenant execution of tenant unaware processes (i.e., OS processes) by using a containerized application to provide tenant isolation at runtime.

In accordance with an embodiment, the present disclosure can utilize containerized applications to provide tenant isolation during runtime of tenant unaware processes.

In accordance with an embodiment, a containerized application or process is an application that is packaged as a container and comprises the necessary information for the application to run, such as OS base image, application executables, and libraries. A containerized application can be a portable application that can be shared among Linux distributions using the same Linux kernel, such a Linux kernel 750. A containerized application can be created such that if a developer creates a portable/containerized application and shares the image, and assuming the same linux kernel, the system that the containerized application was shared with can download the containerized application image from a container image registry or repository and spin off a container to run the containerized application. At this point, the application will be available on the destination host isolated from other containers and from the OS, and it can still be available with the required libraries (e.g., the same versions of the libraries that the developer of the application/process intended). Then, there can be another containerized application instance that uses the same versions of the libraries, but it will run separately. Docker is an example of such a container framework/infrastructure.

Figure 7:
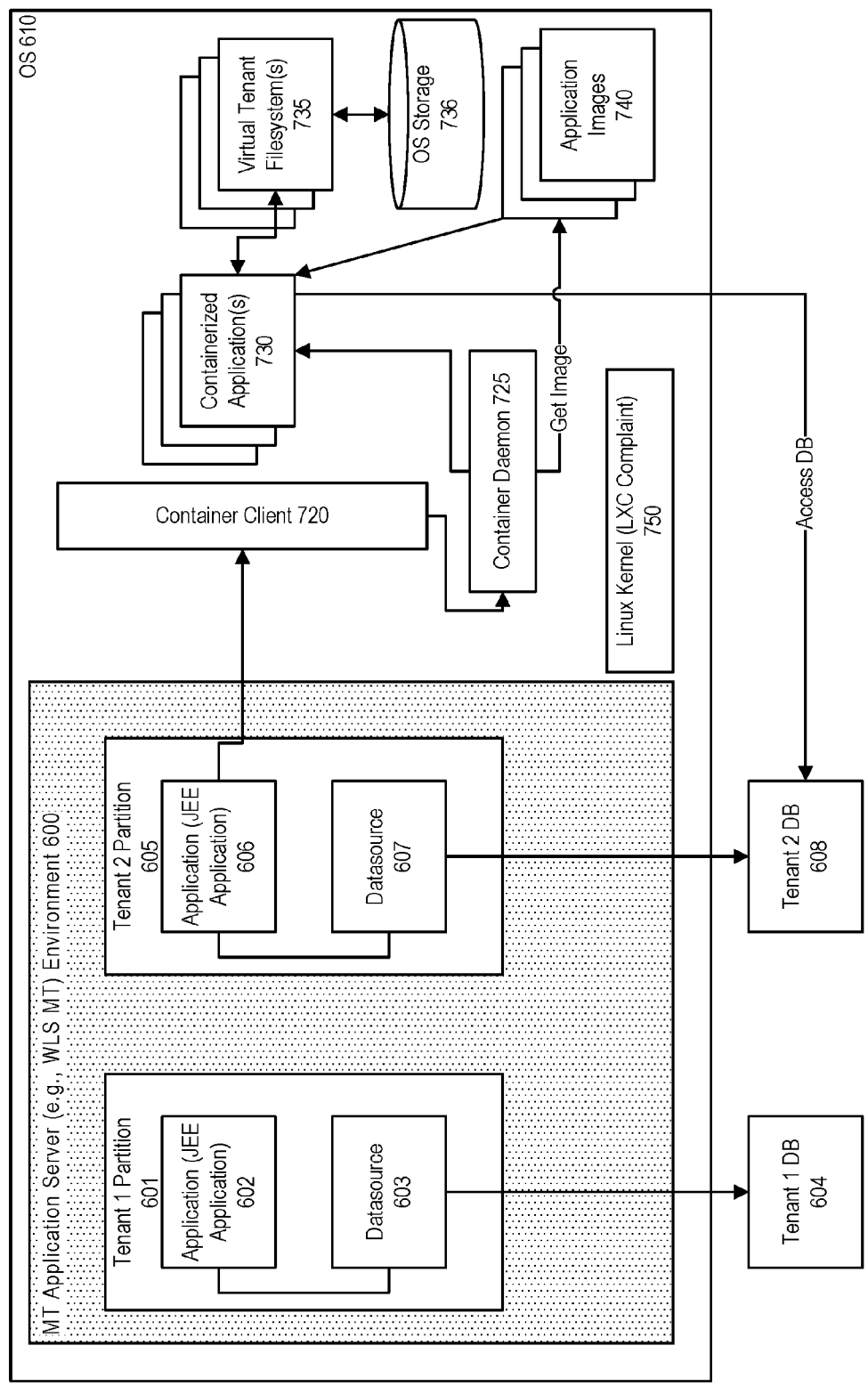
FIG. 7 illustrates a system for tenant scoped execution of a tenant-unaware process, in accordance with an embodiment.

FIG. 7 illustrates a system for multitenant execution of a tenant-unaware process, in accordance with an embodiment. FIG. 7 depicts multitenant execution of OS programs, called from a MT application, using containerized OS applications executing in an OS that supports software containers.

As shown in FIG. 7, a MT application server environment 600 (e.g., WebLogic Multitenant) can comprises a number of tenant partitions, such as tenant 1 partition 601 and tenant 2 partition 605. Both tenant 1 partition and tenant 2 partition can be associated with an application, such as a JEE application 602, 606, respectively, which are associated with a datasource 603, 607, respectively, which allows access to each tenant's respective database 604, 608, respectively.

In accordance with an embodiment, when a MT application (e.g., a JEE application), invokes a tenant unaware application (e.g., as a containerized application), the MT application can set up a number of variables (i.e., environment variables) in order to extend/propagate the tenant context that is available to the JEE application. These variables can include a tenant ID, a tenant name; a tenant filesystem (TFS) root; a process work directory, under TFS, with input, output, and error sub-directories; a tenant DB connect string, and a tenant LDAP (lightweight directory access protocol) directory URL.

In accordance with an embodiment, the MT application server can manage a virtual tenant filesystem 735 for each tenant that has been on-boarded into the MT application server environment 600. This virtual tenant file system can be created/set up as part of an application server administration when a tenant is on-boarded. The virtual tenant filesystems are part the OS 610, with one virtual tenant filesystem for each tenant currently active in the MT application server environment.

In accordance with an embodiment, when an MT application (e.g., JEE application) invokes a tenant unaware application, the MT application can additionally create a temporary process work directory (also referred to herein as "process work directory") under the tenant's virtual filesystem. If more than one tenant unaware application is invoked by an MT application, the MT application can create one process work directory for each tenant unaware application invoked. The MT application, in creating the process work directory under the virtual filesystem, can additionally create (for each tenant unaware application invoked) subdirectories under the process work directory for input, output, error and database directories. These subdirectories can accept redirected stdin (input stream), stdout (output stream) and stderr (error stream) of the invoked OS process. Each input subdirectory can set up with process input files. Each output subdirectory can be responsible for capturing process output files. Each error subdirectory can be responsible for capturing process error (e.g., stderr) messages. The virtual tenant specific filesystems can be associated with a native storage, such as OS storage 736.

In accordance with an embodiment, a process builder, which can be utilized by an MT application, can comprise an API (e.g., Java ProcessBuilder API) that allows a client to specify a command line for an tenant unaware application to execute, configure environment variables to set up in the process environment, configure a process work directory, and redirect the process input, output, and error streams to files on a file system. The process builder can allow certain process characteristics to be set up or configured before a process (i.e., tenant unaware application) is started, such as a process environment, a process working directory, and process input stream/output stream/error stream re-direction.

In accordance with an embodiment, when a MT application invokes a tenant unaware application, it can create and utilize a process builder (e.g., process builder instance). The tenancy context from the MT application can be propagated as part of the process builder API invocation, including setting environmental variables and creating the temporary process work directory. By utilizing the environment variables along with the temporary process work directory, the process builder can be configured in order to assign resources (environment variables, process work directory, redirected input/output/error streams, a database connect descriptor, LDAP directory, wallet) that allows the tenant unaware application to be scoped/confined in its execution within the tenancy context. In this way, the tenant unaware application gets a work directory that is specific to the invoking tenant and under the tenant designated virtual filesystem and isolated from the files created or owned by other tenants of the MT application server environment 600.

In accordance with an embodiment, the tenant unaware application is assigned a tenant specific folder under the OS file-system for redirected process I/O streams, connects to the database associated with the tenant using tenant specific access credentials, and uses tenant specific LDAP directory. A tenant specific database connect string/descriptor can allow programs to transparently work with the tenant database. Tenant specific credentials can be configured in a wallet set up under the database subdirectory under the process work directory in the tenant's virtual filesystem.

In accordance with an embodiment, after a virtual tenant filesystem has been created for the calling MT application from a calling partition (associated with a tenant, sometimes referred to as a "calling tenant"), the streams (e.g., input stream, output stream, error stream) associated with the tenant unaware application (e.g., containerized application) can be redirected to the respective input, output and error subdirectories under the process work directory in the tenant's virtual filesystem.

In accordance with an embodiment, the tenant unaware application (which is invoked from an MT application, such as a JEE application calling from tenant 2's partition) can be packaged as a containerized application. In an exemplary process, a MT application can invoke an OS program. In such a case, a process builder (e.g., Java ProcessBuilder) can invoke the containerized application. Container frameworks provide a lightweight container virtualization technology. One such container framework is Docker.

In accordance with an embodiment, the container runtime, such as Docker, defines a format for packaging an application and all of the application's dependencies into a single image. This image can be transferred to any Docker-enabled machine, where it can be executed with the guarantee that the execution environment exposed to the application will be the same.

Using an OS with a container framework, such as Docker, the system can create an application container image that includes a base OS (e.g., Ubuntu) along with a layered filesystem that contains the application binaries and required libraries and components. The image can be self-contained and portable allowing it to run the application, without any dependencies on the host, when the containerized application is launched.

In accordance with an embodiment, a MT application (i.e., JEE application 606) can invoke a tenant unaware application by launching a container process (e.g., Docker or Rocket). A container client 720, such as a Docket Client, be invoked by an MT Application using the Process Builder (e.g., a JEE application 606 running in tenant 2's partition 605) to launch an OS (tenant unaware) application with the tenancy context from the originator of the request (i.e., the JEE application). The container client can invoke a container daemon 725, such as a Docker daemon. The container daemon can then download and launch an application image 740 of the requested containerized application from the JEE application. The application image 740 can comprise a base OS (e.g., Ubuntu) along with a layered filesystem that contains the application binaries and required libraries and components. The application image can be self-contained and portable, allowing it to run an application without any dependencies on the host. In addition, the containerized application can run as isolated instances. The containerized applications run on the same OS, but execute in isolation, meaning that two or more tenants can run different instances of the same application in isolation as separate containers.

In accordance with an embodiment, when a container is created (by the container daemon), and an application image is loaded into the container to run the containerized application 730, the application can then be run without any dependencies on the host.

In accordance with an embodiment, the containerized application 730 can communicate (I/O) with tenant's virtual tenant filesystem 735 (based upon the tenant context, for example, tenant 2's partition, which in turn can communicate with the OS storage 736).

In accordance with an embodiment, a containerized application operating on behalf of a tenant, e.g., tenant 2, can access the tenant's database 608 with the necessary credentials.

In accordance with an embodiment, the MT application can get the process exitValue status code (e.g., from java Process object exitValue( ) method) to find if the program executed successfully. It can also retrieve the redirected stdout and stderr files under the output and error sub-folders, to examine if the process execution was successful. The results updated in the tenant database can be directly accessed from the database by the MT application running in the partition, once the tenant unaware containerized application execution completes.

In accordance with an embodiment, the MT application can also delete the process work directory and its sub-folders, which cleans up the output files and the db files, such as the wallet.

Figure 8:
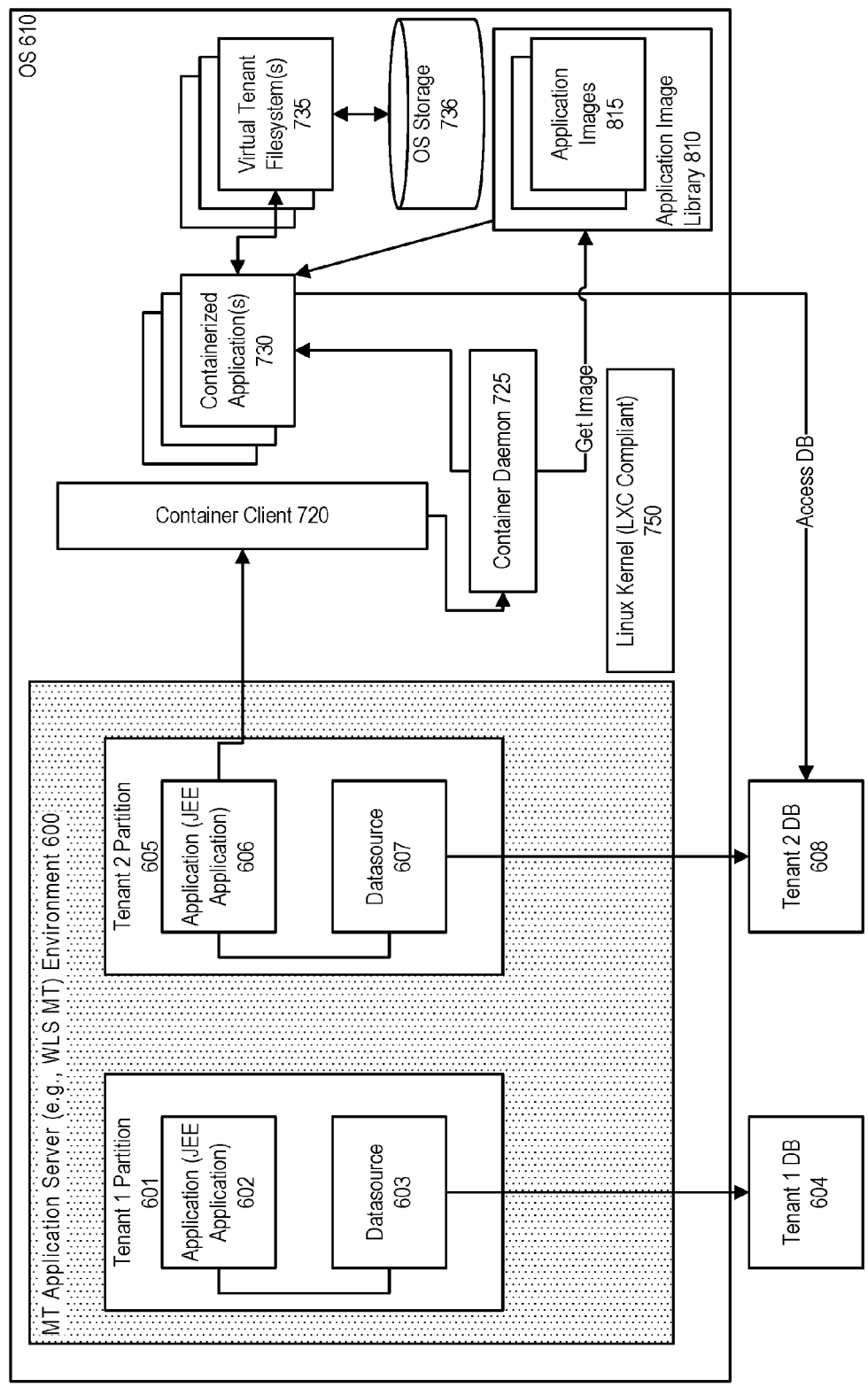
FIG. 8 illustrates a system for tenant scoped execution a tenant-unaware process, in accordance with an embodiment.

FIG. 8 illustrates a system for multitenant execution of a tenant-unaware process, in accordance with an embodiment. FIG. 8 depicts multitenant execution of OS programs, called from a MT application, using containerized OS applications executing in containers.

As shown in FIG. 8, a MT application server environment 600 (e.g., WebLogic Multitenant) can comprises a number of tenant partitions, such as tenant 1 partition 601 and tenant 2 partition 605. Both tenant 1 partition and tenant 2 partition can be associated with an application, such as a JEE application 602, 606, respectively, which are associated with a datasource 603, 607, respectively, which allows access to each tenant's respective database 604, 608, respectively.

In accordance with an embodiment, when a MT application (e.g., a JEE application), invokes a tenant unaware application (e.g., as a containerized application), the MT application can set up a number of variables (i.e., environment variables) in order to extend/propagate the tenant context that is available to the JEE application. These variables can include a tenant ID, a tenant name; a tenant filesystem (TFS) root; a process work directory, under TFS, with input and output sub-directories; a tenant DB connect string, and a tenant LDAP (lightweight directory access protocol) directory URL.

In accordance with an embodiment, the MT application server can manage a virtual tenant filesystem 735 for each tenant that has been on-boarded into the MT application server environment 600. This virtual tenant file system can be created/set up as part of an application server administration when a tenant is on-boarded. The virtual tenant filesystems are part the OS 610, with one virtual tenant filesystem for each tenant currently active in the MT application server environment.

In accordance with an embodiment, when an MT application (e.g., JEE application) invokes a tenant unaware application, the MT application can additionally create a temporary process work directory under the tenant's virtual filesystem. If more than one tenant unaware application is invoked by an MT application, the MT application can create one process work directory for each tenant unaware application invoked. The MT application, in creating the process work directory under the virtual filesystem, can additionally create (for each tenant unaware application invoked) subdirectories under the process work directory for input, output, error and database directories. These subdirectories can accept redirected (stdin) input streams, (stdout) output streams and (stderr) error streams. Each input subdirectory can be responsible set up with process input files. Each output subdirectory can be responsible for capturing process output files. Each error subdirectory can be responsible for capturing process error (e.g., stderr) messages. The virtual tenant specific filesystems can be associated with a native storage, such as OS storage 736.

In accordance with an embodiment, a process builder can comprise an API (e.g., Java ProcessBuilder API) that allows a client to specify a command line for an tenant unaware application to execute, configure environment variables to set up in the process environment, configure a process work directory, and redirect the process input, output, and error streams to files on a file system. The process builder can allow certain process characteristics to be set up or configured before a process (i.e., tenant unaware application) is started, such as a process environment, a process working directory, and process input stream/output stream/error stream re-direction.

In accordance with an embodiment, when a MT application invokes a tenant unaware application, it can create and utilize a process builder (e.g., process builder instance). The tenancy context from the MT application can be propagated as part of the process builder API invocation, including setting environmental variables. The MT application can create a process work directory and sub-directories (input, output, error, and database) under the VTFS (virtual tenant filesystem). The MT application can then use the process builder API to configure the environment variables, process work directory with the temp process work directory path, redirected streams. By utilizing the environment variables along with the process work directory, the process builder can be configured in order to assign resources (environment variables, process work directory, redirected input/out files, a database connect descriptor, LDAP directory, wallet) that allows the tenant unaware application to be scoped/confined in its execution within the tenancy context. In this way, the tenant unaware application gets a work directory that is specific to the invoking tenant and under the tenant designated virtual filesystem and isolated from the files created or owned by other tenants of the MT application server environment 600.

In accordance with an embodiment, the tenant unaware application uses a tenant specific folder under the OS file-system for I/O operations, connects to the database associated with the tenant using tenant specific access credentials, and uses tenant LDAP directory. A tenant specific database connect string/descriptor can allow programs to transparently work with the tenant database. Tenant specific credentials can be configured in a wallet set up under the database subdirectory within the process work directory in the tenant's virtual filesystem.

In accordance with an embodiment, after a virtual tenant filesystem has been created for the calling MT application from a calling partition (associated with a tenant, sometimes referred to as a "calling tenant"), the streams (e.g., input stream, output stream, error stream) associated with the tenant unaware application (e.g., containerized application) can be redirected to the respective sub-folders under the process work directory in the tenant's virtual filesystem.

In accordance with an embodiment, the tenant unaware application (which is called from an MT application, such as a JEE application calling from tenant 2's partition) can be packaged as a containerized application. In an exemplary process, a MT application can invoke an OS program. In such a case, the process builder API is configured by the MT application to invoke a container process. One such container framework/infrastructure is Docker.

In accordance with an embodiment, the container framework/infrastructure, such as Docker, can define a format for packing an application and all its dependencies into a single image. This image can be uploaded to a Docker hub/repository, from where it can be downloaded and executed with the guarantee that the execution environment exposed to the application will be the same.

In accordance with an embodiment, using a container framework, such as Docker, the system can download a previously created container image 815 from an application image library 810. The application image 815 can include a base OS (e.g., Ubuntu) along with a layered filesystem that contains the application binaries and required libraries and components. The image can be self-contained and portable allowing it to run the application, without any dependencies on the host, when the container is created and application launched within it.

In accordance with an embodiment, the application image library 815 can be set up on a host local file system, and can include a number of containerized application images (e.g., .tar files) for desired programs and applications that can be invoked from applications running within a MT application server. Such application images can include, for example, commonly requested OS programs and applications.

In accordance with an embodiment, a MT application (i.e., JEE application 606) can invoke a tenant unaware application by launching a container process (e.g., Docker or Rocket). A container client 720, such as a Docket Client, can be invoked by the MT Application using the Process Builder (e.g., a JEE application 606 running in tenant 2's partition 605) to launch an OS (tenant unaware) application with the tenancy context from the originator of the request (i.e., the JEE application). The container client can invoke a container daemon 725, such as a Docker daemon. The container daemon can then download and launch an application image 740 of the requested containerized application from the JEE application. The application image 740 can comprise a base OS (e.g., Ubuntu) along with a layered filesystem that contains the application binaries and required libraries and components. The application image can be self-contained and portable, allowing it to run an application without any dependencies on the host. In addition, the containerized application can run as isolated instances. The containerized applications run on the same OS, but execute in isolation, meaning that two or more tenants can run different instances of the same application in isolation as separate containers.

In accordance with an embodiment, the container repository 810 can be populated with a number of application images 815. These application images can pre-populated into the application image library, or, can also be saved into the application image library after the container process of FIG. 8 creates an application image.

In accordance with an embodiment, when a container is created (by the container daemon), and an application image is loaded into the container to run the containerized application 730, the application can then be run without any dependencies on the host.

In accordance with an embodiment, the containerized application 730 can communicate (I/O) with tenant's virtual tenant filesystem 735 (based upon the tenant context, for example, tenant 2's partition, which in turn can communicate with the OS storage 736).

In accordance with an embodiment, a containerized application operating on behalf of a tenant, e.g., tenant 2, can access the tenant's database 608 with the necessary credentials.

In accordance with an embodiment, the MT application can get the process exitValue status code (e.g., from java Process object exitValue( ) method) to find if the program executed successfully. It can also retrieve the redirected stdout and stderr files under the output and error sub-folders, to examine if the process execution was successful. The results updated in the tenant database can be directly accessed from the database by the MT application running in the partition, once the tenant unaware containerized application execution completes.

In accordance with an embodiment, the MT application can also delete the process work directory and its sub-folders, which cleans up the output files and the db files, such as the wallet.

Figure 9:
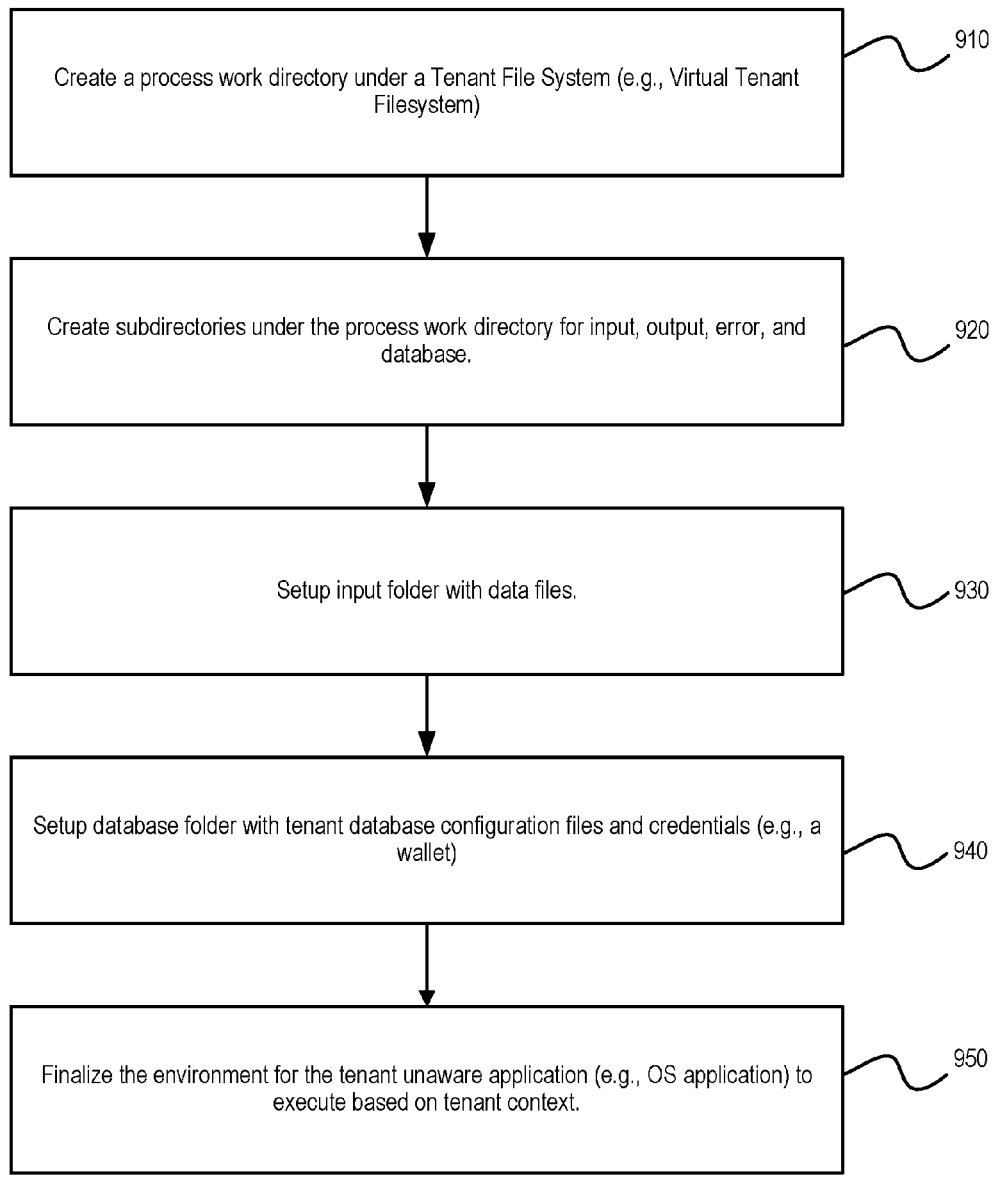
FIG. 9 is a flow chart of an exemplary method for creating environment and resources for tenant scoped execution of a tenant unaware process, in accordance with an embodiment.

FIG. 9 is a flow chart of an exemplary method for creating environment and resources for tenant scoped execution of a tenant unaware process, in accordance with an embodiment. At step 910, a process work directory can be created under a tenant file system (e.g., the virtual tenant filesystem). At step 920, subdirectories under the process work directory can be created for input, output, error and database folders. At step 930, the input folder can be set up with data files. At step 940, the database folder can be set up with tenant database configuration files and credentials (e.g., a wallet). At step 950, the environment can be finalized for the tenant unaware applications (e.g., OS applications/processes) to execute based on tenant context.

Figure 10:
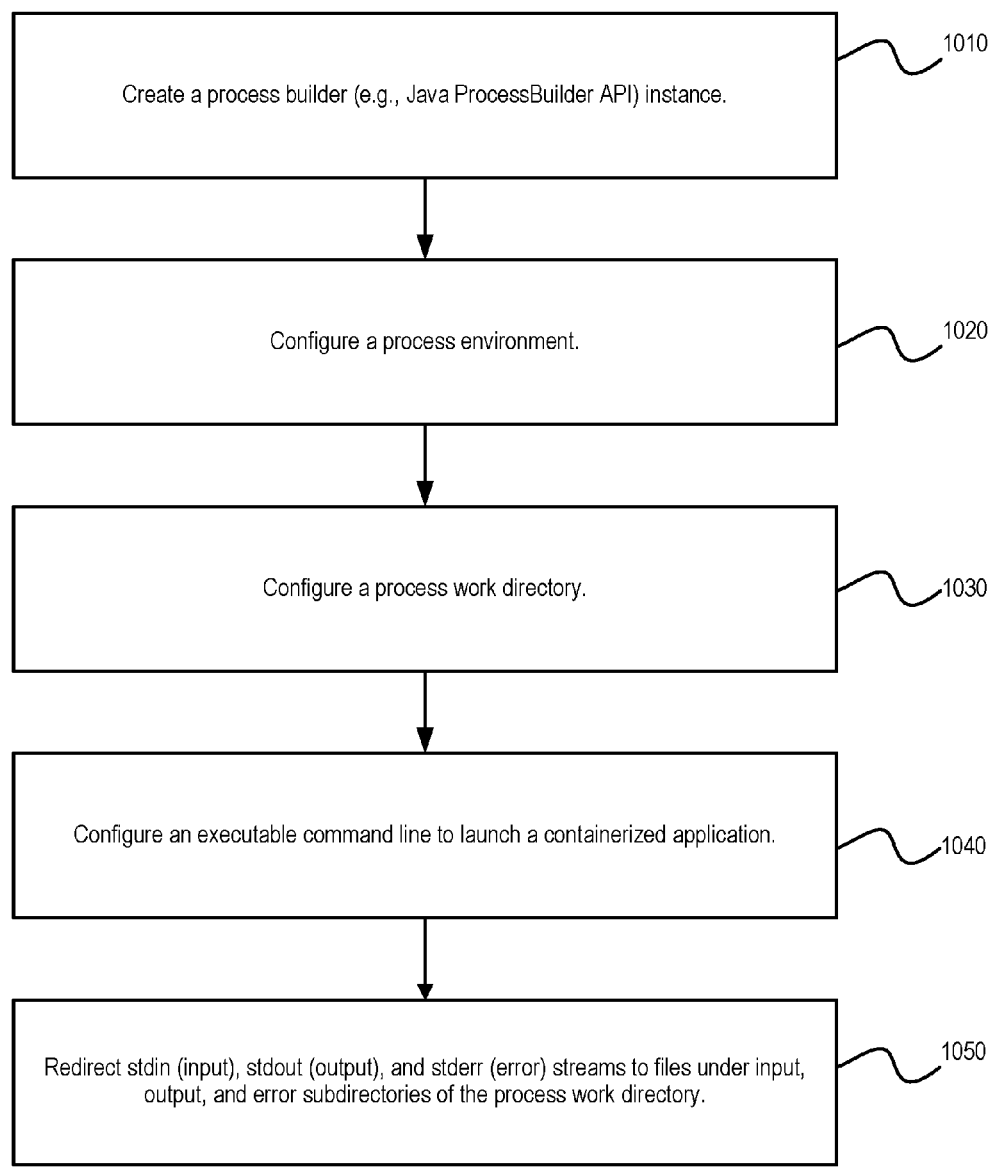
FIG. 10 is a flow chart of an exemplary method for creating and configuring a process builder, in accordance with an embodiment.

FIG. 10 is a flow chart of an exemplary method for creating and configuring a process builder to launch a containerized application, in accordance with an embodiment. At step 1010, a process builder instance (e.g., Java ProcessBuilder API) can be created. At step 1020, the process environment can be configured (e.g., with tenant context). At step 1030, the process work directory can be configured. At step 1040, the method can configure an executable command line to launch a containerized application. At step 1050, streams from the containerized application, such as input stream, output stream, and error stream, can be redirected to the input, output, and error subdirectories of the process work directory.

Figure 11:
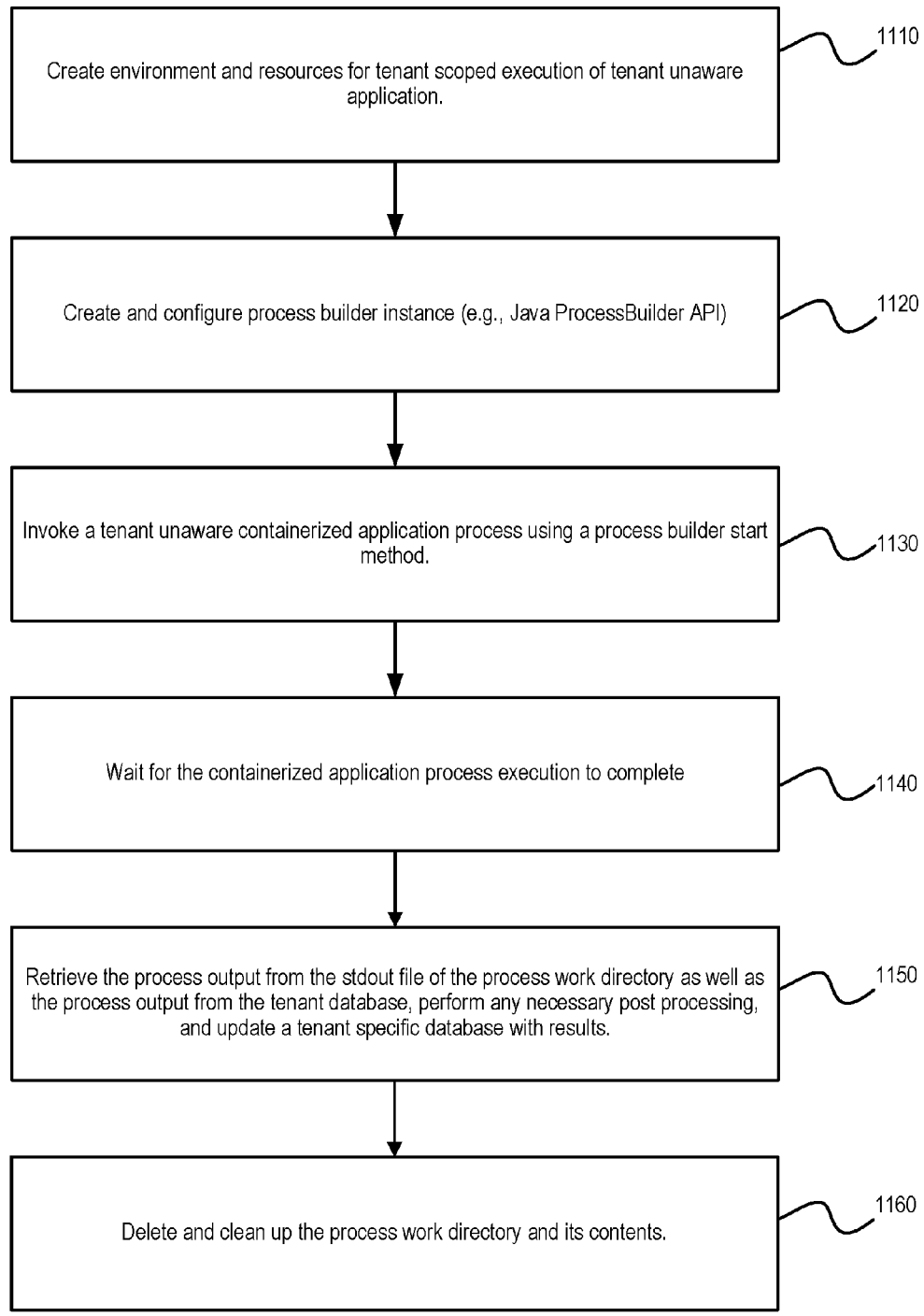
FIG. 11 is a flow chart of an exemplary method for multitenant execution of a tenant unaware OS application from a MT middleware application (e.g., JEE application), in accordance with an embodiment.

FIG. 11 is a flow chart of an exemplary method for multitenant execution of a tenant unaware OS application from a MT middleware application (e.g., JEE application), in accordance with an embodiment. As a prerequisite to this exemplary method, an OS application (i.e., the OS application meant to be invoked from the MT application server environment) can be packaged as a containerized application (e.g., containerized application image). At step 1110, a process environment and resources for tenant scoped execution can be created, as identified by the flow chart in FIG. 9. At step 1120, a process builder (e.g., Java ProcessBuilder API instance) can be created and configured, as identified by the flow chart in FIG. 10. At step 1130, the method can invoke the containerized OS application process using the process builder start method. This step creates the configured tenant specific execution environment and starts the container process. The containerized application can run with the tenant specific environment and resources, with runtime isolation from other containers & OS processes, enforced by the container runtime. At step 1140, the method can wait for the containerized application process execution to complete. At step 1150, retrieve the process output from the stdout file of the process work directory as well as the process output from the tenant database, perform any necessary post processing, and update a tenant specific database with results. At step 1160, the method can delete and clean up the process work directory and its contents.

Figure 12:
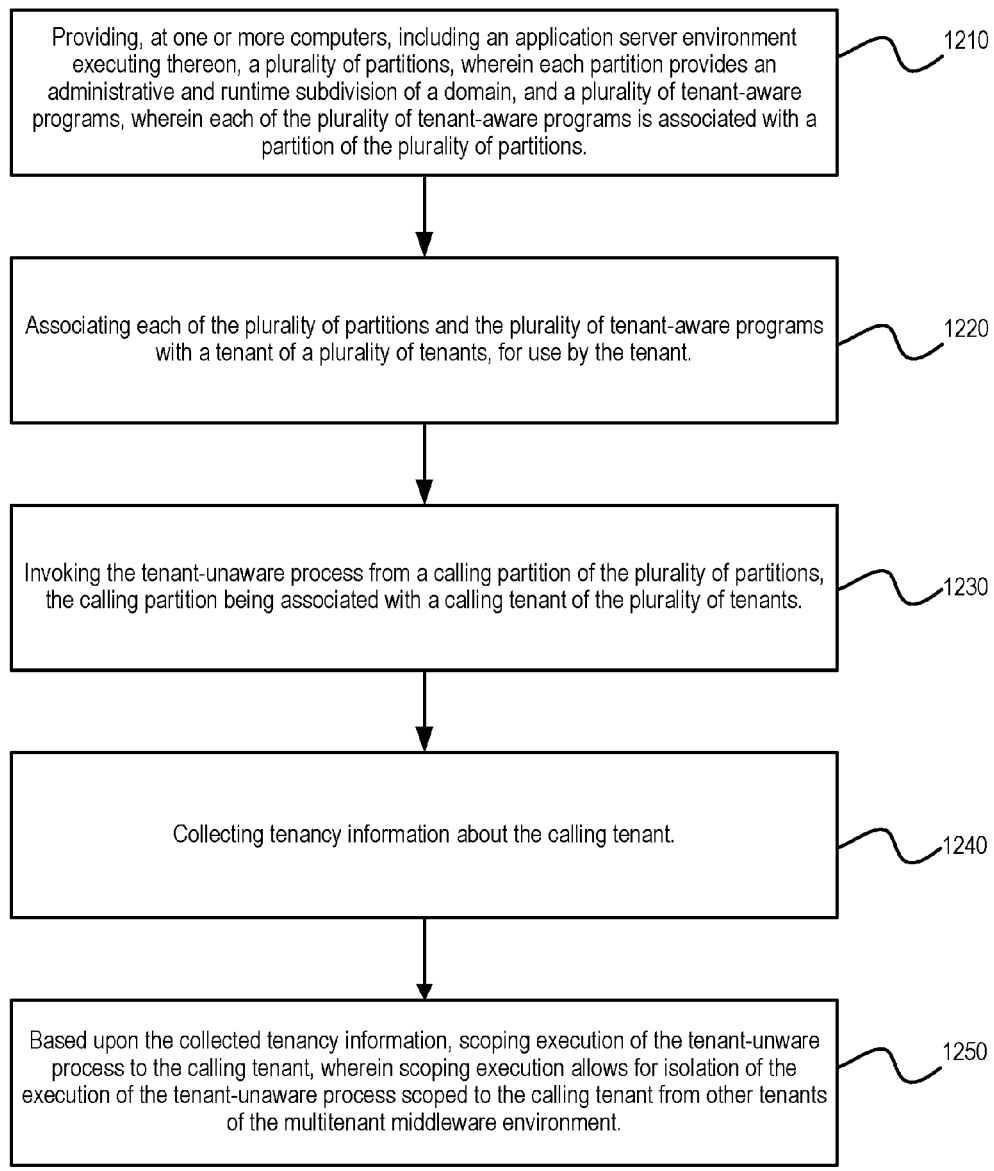
FIG. 12 is a flow chart of an exemplary method for supporting tenant scoped execution of a tenant-unaware process invoked from a multitenant middleware application

FIG. 12 is a flow chart of an exemplary method for supporting tenant scoped execution of a tenant-unaware process invoked from a multitenant middleware application. At step 1210, the method can provide, at one or more computers, including an application server environment executing thereon, a plurality of partitions, wherein each partition provides an administrative and runtime subdivision of a domain, and a plurality of tenant-aware programs, wherein each of the plurality of tenant-aware programs is associated with a partition of the plurality of partitions.

At step 1220, the method can associate each of the plurality of partitions and the plurality of tenant-aware programs with a tenant of a plurality of tenants, for use by the tenant.

At step 1230, the method can invoke the tenant-unaware process from a calling partition of the plurality of partitions, the calling partition being associated with a calling tenant of the plurality of tenants.

At step 1240, the method can collect tenancy information about the calling tenant.

At step 1250, the method can, based upon the collected tenancy information, scope execution of the tenant-unaware process to the calling tenant, wherein scoping execution allows for isolation of the execution of the tenant-unaware process scoped to the calling tenant from other tenants of the multitenant middleware environment The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for supporting tenant scoped execution of a tenant-unaware process invoked from a multitenant middleware application, comprising:
   providing, at one or more computers, including an application server environment executing thereon,
      a plurality of partitions, wherein each partition provides an administrative and runtime subdivision of a domain, and
      a plurality of tenant-aware programs, wherein each of the plurality of tenant-aware programs is associated with a partition of the plurality of partitions;
   associating each of the plurality of partitions and the plurality of tenant-aware programs with a tenant of a plurality of tenants, for use by the tenant;
   invoking the tenant-unaware process from a calling partition of the plurality of partitions, the calling partition being associated with a calling tenant of the plurality of tenants;
   collecting tenancy information about the calling tenant;
   creating, based upon the collected tenancy information about the calling tenant, a tenant specific virtual filesystem; and
   based upon the collected tenancy information, scoping execution of the tenant-unaware process to the calling tenant by setting up a process execution environment and resources, wherein scoping execution of the tenant-unaware process to the calling tenant comprises:
      redirecting streams of the tenant-unaware process to the tenant specific virtual filesystem, wherein streams of the tenant-unaware process comprise at least one of an input stream, an output stream, and an error stream;
   wherein scoping execution allows for isolation of the execution of the tenant-unaware process scoped to the calling tenant from other tenants of the multitenant middleware environment.

2. The method of claim 1, wherein the multitenant middleware application is associated with calling partition of the plurality of partitions, and wherein the multitenant middleware application passes the tenancy information in connection with invoking the tenant-unaware process.

3. The method of claim 2, further comprising:
   creating a process work directory under the tenant specific virtual filesystem, wherein the process work directory comprises an input subdirectory, an output subdirectory, a database subdirectory, and an error subdirectory.

4. The method of claim 3, further comprising:
   setting up the input subdirectory with at least one data file; and
   setting up the database subdirectory with a wallet, the wallet comprising configuration files and credentials associated with the calling tenant.

5. The method of claim 4, wherein the streams of the tenant-unaware process are respectively redirected to the input subdirectory, output subdirectory, and error subdirectory of the process work directory.

6. The method of claim 5, further comprising:
   after completion of the tenant-unaware process, accessing, by the tenant-unaware process, a tenant-specific database, wherein access is granted via the wallet; and
   after completion of the tenant-unaware process and accessing, by the tenant-unaware process, a tenant-specific database, cleaning up the tenant specific virtual filesystem, wherein cleaning up the tenant specific virtual filesystem comprises deleting the process work directory.

7. The method of claim 1, wherein the tenant-unaware process invoked from the calling partition of the plurality of partitions is part of a composite application, the composite application further comprising a tenant aware application running in the context of the calling partition of the plurality of partitions.

8. A system for supporting tenant scoped execution of a tenant-unaware process invoked from a multitenant middleware application, comprising:
   one or more computers, including an application server environment executing thereon, together with
      a plurality of partitions, wherein each partition provides an administrative and runtime subdivision of a domain, and
      a plurality of tenant-aware programs, wherein each tenant-aware program is associated with one of the plurality of partitions,
      wherein each of the plurality of partitions and the plurality of tenant-aware programs are associated with a tenant of a plurality of tenants, for use by the tenant; and
   wherein a calling partition of the plurality of partitions invokes the tenant-unaware process, the calling partition being associated with a calling tenant of the plurality of tenants;
   wherein tenancy information about the calling tenant is collected;
   wherein a tenant specific virtual filesystem is crated based upon the collected tenancy information about the calling tenant,
   wherein, based upon the collected tenancy information, execution of the tenant-unaware process is scoped to the tenant by setting up a process execution environment and resources, wherein scoping execution of the tenant-unaware process to the calling tenant comprises:
      redirecting streams of the tenant-unaware process to the tenant specific virtual filesystem, wherein streams of the tenant-unaware process comprise at least one of an input stream, an output stream, and an error stream; and
   wherein scoping execution of the tenant-unaware process allows for isolation of the execution of tenant-unaware process scoped to the calling tenant from other tenants of the multitenant middleware environment.

9. The system of claim 8, wherein the multitenant middleware application is associated with calling partition of the plurality of partitions, and wherein the multitenant middleware application passes the tenancy information in connection with invoking the tenant-unaware process.

10. The system of claim 9, where a work process directory is created under the tenant specific virtual filesystem, wherein the process work directory comprises an input subdirectory, an output subdirectory, a database subdirectory, and an error subdirectory.

11. The system of claim 10, wherein the input subdirectory is set up with at least one data file, and wherein the database subdirectory is set up with a wallet, the wallet comprising configuration files and credentials associated with the calling tenant.

12. The system of claim 11, wherein the streams of the tenant-unaware process are respectively redirected to the input subdirectory, output subdirectory, and error subdirectory of the process work directory.

13. The system of claim 12, wherein after completion of the tenant-unaware process, accessing, by the tenant-unaware process, a tenant-specific database using the wallet, and wherein the tenant specific virtual filesystem is cleaned up after completion of the tenant-unaware process, wherein cleaning up the tenant specific virtual filesystem comprises deleting the process work directory.

14. The system of claim 8, wherein the tenant-unaware process invoked from the calling partition of the plurality of partitions is part of a composite application, the composite application further comprising a tenant aware application running in the context of the calling partition of the plurality of partitions.

15. A non-transitory computer readable storage medium, including instructions stored thereon for supporting tenant scoped execution of a tenant-unaware process invoked from a multitenant middleware application which when read and executed by one or more computers cause the one or more computers to perform steps comprising:
   providing, at one or more computers, including an application server environment executing thereon,
      a plurality of partitions, wherein each partition provides an administrative and runtime subdivision of a domain, and
      a plurality of tenant-aware programs, wherein each of the plurality of tenant-aware programs is associated with a partition of the plurality of partitions;
   associating each of the plurality of partitions and the plurality of tenant-aware programs with a tenant of a plurality of tenants, for use by the tenant;
   invoking the tenant-unaware process from a calling partition of the plurality of partitions, the calling partition being associated with a calling tenant of the plurality of tenants;
   collecting tenancy information about the calling tenant;
   creating, based upon the collected tenancy information about the calling tenant, a tenant specific virtual filesystem; and
   based upon the collected tenancy information, scoping execution of the tenant-unaware process to the calling tenant by setting up a process execution environment and resources, wherein scoping execution of the tenant-unaware process to the calling tenant comprises:
      redirecting streams of the tenant-unaware process to the tenant specific virtual filesystem, wherein streams of the tenant-unaware process comprise at least one of an input stream, an output stream, and an error stream;
   wherein scoping execution allows for isolation of the execution of the tenant-unaware process scoped to the calling tenant from other tenants of the multitenant middleware environment.

16. The non-transitory computer readable storage medium of claim 15, wherein the multitenant middleware application is associated with calling partition of the plurality of partitions, and wherein the multitenant middleware application passes the tenancy information in connection with invoking the tenant-unaware process.

17. The non-transitory computer readable storage medium of claim 16, the steps further comprising:
   creating a process work directory under the tenant specific virtual filesystem, wherein the process work directory comprises an input subdirectory, an output subdirectory, a database subdirectory, and an error subdirectory.

18. The non-transitory computer readable storage medium of claim 17, the steps further comprising:
   setting up the input subdirectory with at least one data file; and
   setting up the database subdirectory with a wallet, the wallet comprising configuration files and credentials associated with the calling tenant.

19. The non-transitory computer readable storage medium of claim 18, wherein the streams of the tenant-unaware process are respectively redirected to the input subdirectory, output subdirectory, and error subdirectory of the process work directory.

20. The non-transitory computer readable storage medium of claim 19, the steps further comprising:
   after completion of the tenant-unaware process, accessing, by the tenant-unaware process, a tenant-specific database, wherein access is granted via the wallet; and
   after completion of the tenant-unaware process and accessing, by the tenant-unaware process, a tenant-specific database, cleaning up the tenant specific virtual filesystem, wherein cleaning up the tenant specific virtual filesystem comprises deleting the process work directory.

21. The non-transitory computer readable storage medium of claim 15, wherein the tenant-unaware process invoked from the calling partition of the plurality of partitions is part of a composite application, the composite application further comprising a tenant aware application running in the context of the calling partition of the plurality of partitions.

* * * * *

UNITED STATES PATENT AND TRADEMARK OFFICE
CERTIFICATE OF CORRECTION

PATENT NO. : 9,811,386 B2  
APPLICATION NO. : 15/059193  
DATED : November 7, 2017  
INVENTOR(S) : Nanjundaswamy Page 1 of 1

It is certified that error appears in the above-identified patent and that said Letters Patent is hereby corrected as shown below:

In Column 2, Line 48, after "application" insert -- . --.

In Column 10, Line 63, after "filesystem" insert -- . --.

In Column 18, Line 51, after "environment" insert -- . --.

Signed and Sealed this  
Twenty-sixth Day of June, 2018

Andrei Iancu  
*Director of the United States Patent and Trademark Office*